United States Patent [19]

Buttle

[11] Patent Number: 5,084,866
[45] Date of Patent: Jan. 28, 1992

[54] TRANSVERSAL FILTER ECHO CANCELLER

[75] Inventor: Kenneth G. Buttle, Orangevale, Calif.

[73] Assignee: Level One Communications, Inc., Folsom, Calif.

[21] Appl. No.: 507,593

[22] Filed: Apr. 10, 1990

[51] Int. Cl.[5] ............................................. H04B 3/23
[52] U.S. Cl. .................................. 370/32.1; 379/411; 364/724.16
[58] Field of Search ............... 370/32.1; 379/410, 411; 364/724.01, 724.16

[56] References Cited

U.S. PATENT DOCUMENTS 3,792,356  2/1974  Kobayashi et al. .
4,412,341 10/1983  Gersho et al. .
4,703,447 10/1987  Lake, Jr. ........................ 364/724.16
4,760,596  7/1988  Agrawal et al. .
4,926,472  5/1990  Batruni et al. ....................... 379/411

OTHER PUBLICATIONS

IEEE Transactions on Communications, Sep., 1976, vol. COM-24, No. 9, pp. 956-962, Kurt H. Mueller, "A New Digital Echo Canceler for Two-Wire Full-Duplex Data Transmission".
IEEE Transactions on Circuits and Systems, Mar., 1987, vol. CAS-34, No. 3, pp. 225-232, Ernst G. Peter, "Multistage RAM: An FIR Filter for Echo Cancellation in a Digital Two-Wire Subscriber Loop".
IEEE Transactions on Communications, Nov., 1982, vol. COM-30, No. 11, pp. 2421-2433, O. Agazzi, D. Messerschmitt, & D. Hodges, "Nonlinear Echo Cancellation of Data Signals".
IEEE Journal on Selected Areas in Communications, Mar., 1984, vol. SAC-2, No. 2, pp. 314-323, P. Van Gerwen, "Design Considerations for a 144 kbit/s Digital Transmission Unit for the Local Telephone Network".

Primary Examiner—Douglas W. Olms
Assistant Examiner—Melvin Marcelo
Attorney, Agent, or Firm—Merchant, Gould, Smith, Edell, Welter & Schmidt

[57] ABSTRACT

A transversal filter apparatus having a shift register, an averaging circuit for averaging data stored in sequential shift registers, and a multiplier for multiplying the averaged data. Additionally, a method and apparatus for echo cancelling a transhybrid response having a well behaved portion by using a transversal filter based echo canceller wherein the data stored in adjacent registers of the shift register which correspond to the well behaved portion of the transhybrid response are averaged together prior to being applied to a multiplier. This apparatus and method makes possible a reduction in the amount of hardware required to achieve a given level of echo cancellation.

12 Claims, 4 Drawing Sheets

TRANSVERSAL FILTER ECHO CANCELLER

BACKGROUND OF THE INVENTION

1. Field of the Invention

The present invention relates generally to the field of electronic filters. In particular, the present invention relates to a transversal filter design that, when used in an echo canceller, gives improved echo cancellation of a transhybrid response having well behaved portions. While the present invention has numerous other applications, it will be described in connection with its use in an integrated services digital network (ISDN) telecommunication system.

2. Background Information

The telephone system has expanded to such a degree that today it is possible for almost anybody to have almost instantaneous communications with almost anybody else almost anywhere in the world. Since the phone system is so ubiquitous, it provides a desirable communication medium for more than just voice-to-voice communication. Additional services such as facsimile transfers, telemail, electronic funds transfer, video data, computers links, and alarm systems benefit from the use of the telephone system.

Using the existing telephone system as a communication channel for the additional services involves more than just connecting a machine to a phone line. For example, the existing phone system wa only designed to transmit analog signals with a bandwidth of about 300-3500 hertz, sufficient for voice communication but not optimum for the additional services which generally transmit data having significantly higher frequency components. The result is that the signals of the additional services distort as they propagate.

Aggravating the problem of using the present system is the fact that only a single twisted pair of wires interconnect a subscriber (user) with a central office. This means that the subscriber's transmitter (mouthpiece) and receiver (earpiece) share the same two wires. While this is a low cost method of connecting subscribers to a central office, because full duplex (simultaneous two-way) operation is desired cancellation of a subscriber's transmission from his own receiver is required. This is understood by considering that if a first and second subscriber both transmit at the same time, the second subscriber's signal attenuates as it travels toward the first subscriber. If the first subscriber does not cancel out of his receiver his own transmission he will hear only his own transmission and not the desired, attenuated second subscriber's signal.

Full duplex operation on two wires therefore requires that a transmitted signal must be reduced sufficiently from the transmitter's own receiver to allow reception of an incoming signal. While readily accomplishable with voice communication, it is much harder to do with the additional services because those services are more sensitive to incompletely cancelled signals.

Exacerbating the problem of increased sensitivity to incompletely cancelled signals are the numerous wire taps, wire gauge changes, and switching networks which cause signal "reflections" in the present phone system. These reflections can be picked up by the transmitter's receiver and, if not handled properly, could be mistaken for a signal from another subscriber.

Even further complicating the use of the present phone system as a communication medium is that the present phone lines have widely variable transmission line characteristics. This creates a problem because any mismatch between the telephone line and the service using the phone line causes an "incident" signal that is reflected into the receiver.

The effects of insufficient echo cancellation, line taps, mismatches, and high frequency are more serious when using the additional services than with just voice communications. To assist in reducing these and other problems, the Accredited Standards Committee on Telecommunications, T1, submitted to the American National Standards Institute a standard for integrated services digital networking, ANSI T1.601-1988, entitled "Integrated Services Digital Network (ISDN)—Basic Access Interface for Use on Metallic Loops for Application on the Network Side of the NT (Layer 1 Specification)." This document describes a minimal set of requirements and protocols for satisfactory communication between subscribers when using the additional services with full duplex operation on the existing single twisted wire pair phone line.

As previously indicated, for acceptable full duplex operation when using the existing single twisted pair phone lines with the additional services the transmitted information must be more fully cancelled despite the increased reflections and the incident signal. Adding together both the reflections and the incident signal one obtains the "transhybrid response." The transhybrid response is then the echo response verses time caused by a transmitted signal.

A signal transmitted on a phone line may become attenuated by as much as 40 db (100 times), making a 5/6 volt transmit signal only about 0.0085 volts at the receiver. Since an echo may be almost as large as a transmit signal, or up to about 2.5 volts, a receiver may be required to detect a 0.0085 volt signal riding on a 2.5 volt echo. Reduction of the echo amplitude to an acceptable amount is the job of the echo canceller.

While the echo canceller must reduce the echo to an acceptable amount (roughly a 60 db reduction), the actual transhybrid response is unknown until the lines connecting the subscribers is established, something that does not occur until a call is answered. Therefore, acceptable methods of echo cancelling must be adaptive, i.e. they must adjust to the line conditions existing at the time of the call.

One commonly used method of echo cancelling was proposed by Kurt H. Mueller in "A New Digital Echo Canceller for Two-Wire Full-Duplex Data Transmission" found in the *IEEE Transactions on Communications*, September 1976, at pp. 956-962. Mr. Mueller proposed using a transversal filter to eliminate the transhybrid response by adjusting the filter's output to cancel the response.

A transversal filter, as used by Mr. Mueller and others, is an electronic device having a storage unit that sequentially stores the data transmitted in each baud period, i.e. a shift register able to store as many data bits as is transmitted. Each baud period's data stored in the shift register is sent to a multiplier whose gain is selected so that each baud period's data, when multiplied by the gain, equals the transhybrid response caused by that data. The summation of all gain multiplied data transmissions is then subtracted from the echo, ideally eliminating it. Each multiplier circuit output is called a tap.

While conceptually it is easy to visualize that a transversal filter based echo canceller could completely cancel the transhybrid response, an infinite number of taps corresponding to an infinite number of prior baud period's transmissions would be required. Since it is impossible to implement an infinite number of taps, in an actual echo canceller the number of taps is limited. This limitation implies that some of the transhybrid response is not cancelled and thus remains as a residual echo.

The assignees of the present invention have found from experimentation on actual telephone lines and from software simulation that latter parts of the transhybrid response when meeting the requirements of ANSI T1.601-1988 are "well behaved" and of an exponentially decaying nature. Well-behaved describes a function similar to one having a dominate single pole with a long time constant, which results in a function having a portion which changes slowly in an exponential manner.

It is therefore useful and desirable to reduce the residual echo from a transhybrid based echo canceller with a given number of taps. Likewise, it is useful and desirable to produce a similar amount of residual echo from a transhybrid based echo canceller having a smaller number of taps.

SUMMARY OF THE INVENTION

Accordingly, it is an object of the present invention to provide a transversal filter apparatus and a method of using that apparatus in an echo canceller to achieve improved cancellation of the transhybrid response when the transhybrid response has a well-behaved section.

In order to achieve the foregoing and other objects an apparatus according to the instant invention is a transversal filter having a shift register with at least three registers, a first multiplier for multiplying data stored in a first register, an averaging network for averaging the data stored in adjacent second and third registers, and a second multiplier for multiplying the output of the averaging network.

According to the instant invention, a method of echo cancelling using a transversal filter is disclosed comprising the steps of storing transmitted data sequentially in a shift register, multiplying the data stored in at least a first register by a first gain, averaging the data stored in at least two sequentially adjacent shift registers, and multiplying the average by a second inputted gain.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2, which consists of FIGS. 2A to 2D, is a waveform representation of typical signals existing when using the ISDN protocol.

DETAILED DESCRIPTION OF THE PREFERRED EMBODIMENT

Figure 1:
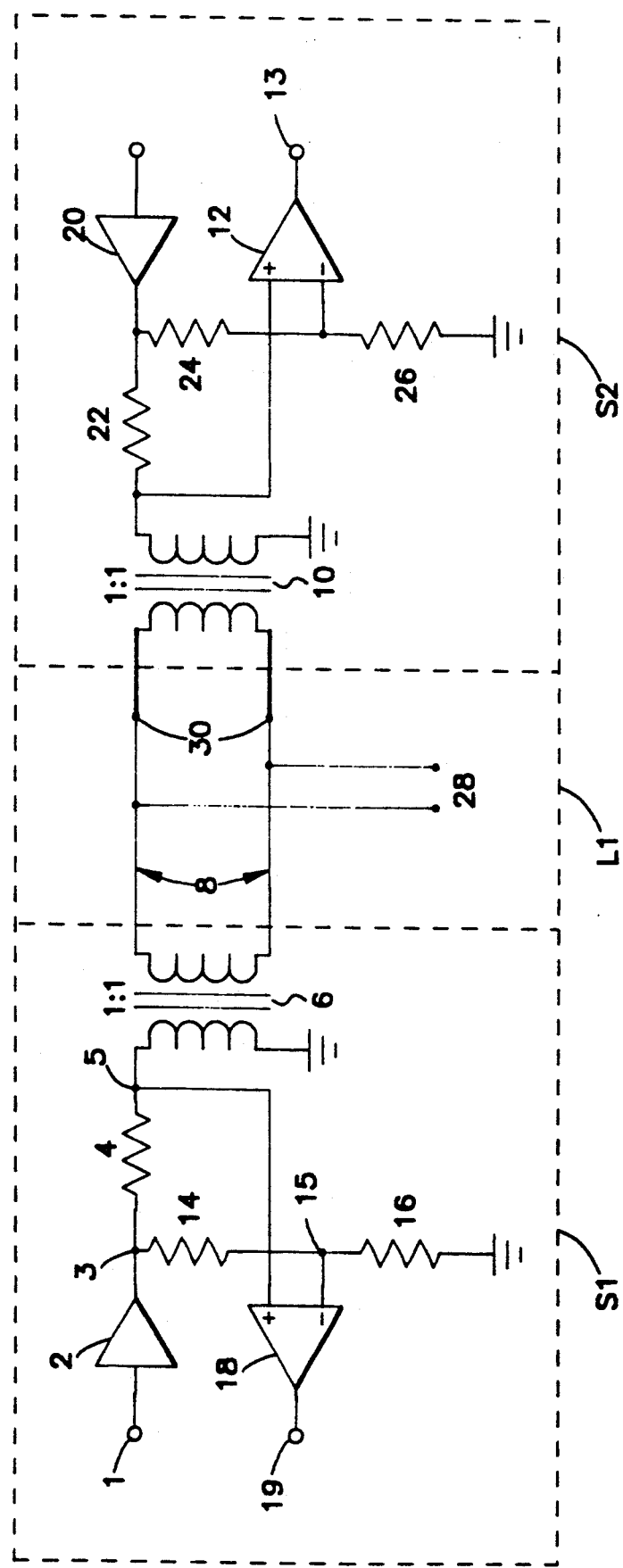
FIG. 1 is a simplified pictorial plan view of a typical two-wire full duplex transmission scheme including a method of echo-cancelling.

Referring now to the drawings, wherein like reference numerals designate corresponding elements throughout the views, and particularly referring to FIG. 1, a simplified pictorial plan view of full duplex operation on a single twisted pair scheme, including an echo canceller, as might be used in voice communication. Shown are three sections: first subscriber network S1, transmission line L1, and second subscriber network S2. First subscriber network S1 has an input applied on node 1 to line driver 2. Line driver 2 conditions the input for transmission on line L1 and outputs a signal to node 3. At node 3 the signal is applied t transformer 6 via resistor 4 and also is applied to resistor 16 via resistor 14.

At the junction of transformer 6 and resistor 4 is node 5, which connects to the positive input of operational amplifier 18. Resistor 4 is ideally selected to have an ohmic value equal to the reflected line impedance of transformer 6 so that maximum power is transferred to line L1. Ideally the voltage at node 5 is then one-half of the voltage at node 3 when only subscriber network S1 is transmitting.

The junction of resistor 14 and resistor 16, ideally equal in value, forms node 15, which also connects to the negative input of operational amplifier 18. Therefore, the voltage at node 15 is ideally ½ the voltage at node 3.

With both the positive and negative inputs of operational amplifier 18 ideally at one-half of voltage at node 3, operational amplifier 18 ideally has no output. However, when subscriber network S2 sends a signal to subscriber network S1, the signal is received at node 5. Operational amplifier 18 then has a voltage difference, corresponding to the signal from subscriber network S2, between its positive and negative inputs. The voltage difference is amplified by the gain of operational amplifier 18 and is available for use by the receiver of subscriber network S1.

Subscriber network S2, consisting of line driver 20, operational amplifier 12, resistor 22, resistor 24, resistor 26, and transformer 10, operates identical to subscriber network S1.

The ideal operation described above is not what occurs in actual operation. Resistor R4, which ideally matches line L1, does not, creating an incident signal mismatch to operational amplifier 18. The mismatch, in part, results from the input impedance to Line L1 not being a pure resistance but rather an impedance not cancellable by a simple resistor. Another cause of the mismatch between line L1 and resistor R4 is the impedance of line L1 is not known until the communication path between subscriber networks S1 and S2 is established.

Another problem that causes the ideal performance of the above circuit to be unachievable in practice is that line L1 has numerous line disturbances such as wire gauge changes 30 and various take-offs 28, otherwise known as "stubs" or "bridged taps." These line disturbances causes reflections of the transmitted signal to go back to the sender. In a simple circuit such as shown in FIG. 1, these reflections are indistinguishable from signals from subscriber network S2. Because of these problems and others, the simple circuit shown in FIG. 1 is unsuitable for most data communications such as those encompassed by ANSI T1.601-1988.

The Accredited Standards Committee on Telecommunications, T1, submitted to the American National Standards Institute a standard for integrated services digital networking, ANSI T1.601-1988, entitled "Integrated Services Digital Network (ISDN)—Basic Access Interface for Use on Metallic Loops for Application on the Network Side of the NT (Layer 1 Specification)." This document describes a minimal set of requirements and protocols for satisfactory communication between subscribers when using the additional services with full duplex operation on the existing single twisted wire pair phone line.

ANSI T1.601-1988 requires that transmitted information must be encoded using a code termed "2B1Q". 2B1Q is pulse amplitude modulation code wherein two data bits are encoded into four levels: if the first bit is a 1 and the second bit is a 0, (10), a 2.5 volt signal is impressed on the line; if the first bit is a 1 and the second bit is a 1,(11), a 5/6th volt signal is impressed on the line; if the first bit is a 0 and the second is a 1, (01), a $-5/6$th volts is impressed on the line; finally, if the first bit is a 0 and the second bit is a 0, (00), a $-2.5$ volt signal is impressed on the line. These digital codes have a $+3$, $+1$, $-1$, $-3$, relationship. ANSI T1.601-1988 also requires that a transmission rate of 80,000 bauds per second must be used, corresponding to 160,000 bits per second because of the 2-bit per baud relationship.

FIG. 2 shows a typical transmitted pulse waveform and the resulting transhybrid response when implementing an ISDN network according to ANSI T1.601-1988. FIG. 2A shows typical transmitted signal according to ANSI T1.601-1988 paragraph 5 et seq. by having a smoothly rising waveform from time T0 to time T1 and smoothly falling one from time T1 to time T2. This smooth waveform reduces the effects of impedance on the line by reducing high frequency components.

Figure 2A:
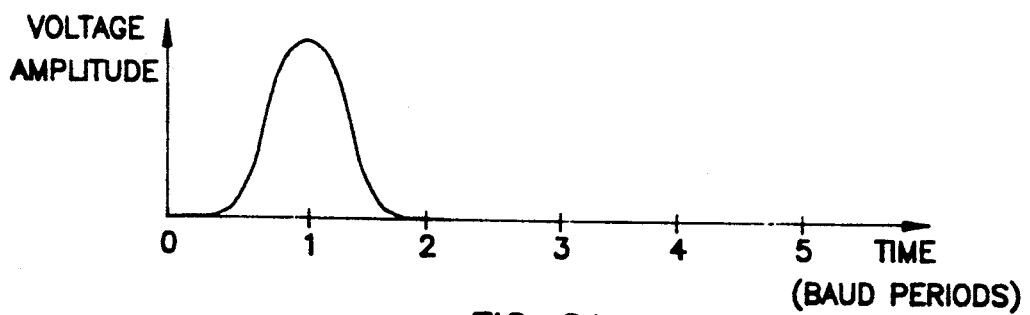
FIG. 2A shows atypical transmitted data.
Figure 2B:
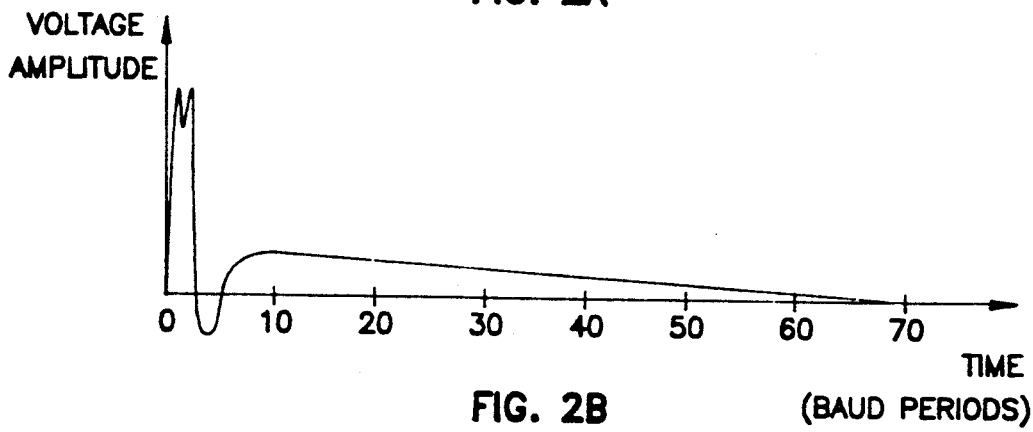
FIG. 2B represents a typical transhybrid response resulting from the transmitted data in FIG. 2A.
Figure 2C:
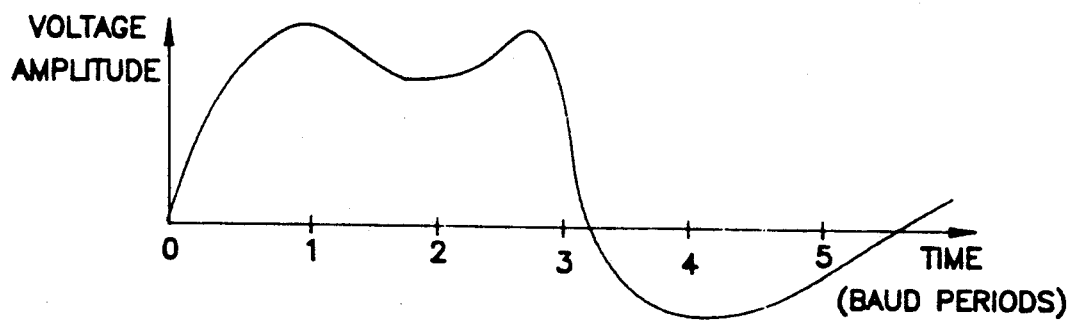
FIG. 2C is the transhybrid response of FIG. 2B with an expanded time scale.

A typical transhybrid response is illustrated in FIG. 2B. The transhybrid response of FIG. 2B covers a much longer time period than the waveform shown in FIG. 2A. Also, the early part of the response is large and variable, being of a peak amplitude approximately that of the transmitted signal, dipping significantly during the second, third and fourth baud periods, and rising again at the fifth period. This volatility is more clearly seen in FIG. 2C, which shows the response of FIG. 2B with an expanded time scale. This representation of the early part of the transhybrid response is only typical and in practice the amplitudes may be large or small, having many rises and dips or none at all. In short the early part of the transhybrid response is highly volatile.

FIG. 2B also shows that the transhybrid response develops a "tail" which slowly decays toward zero from about the eighth baud period on. The assignees of the present invention have found from experimentation on actual telephone lines and from software simulation that the latter parts of the transhybrid response, when meeting the requirements of ANSI T1.601-1988, are "well behaved." Well behaved describes a transfer function similar to one having a dominate single pole with a long time constant. The latter part of the transhybrid response has a slender tail of an exponentially decaying nature that gets monotonically closer to zero over time. However, while FIG. 2 shows the well behaved portion starting at about the 8th baud period, in actual practice the assignees of the present invention begin their assumption of a well-behaved section at about the 16th baud period.

Figure 2D:
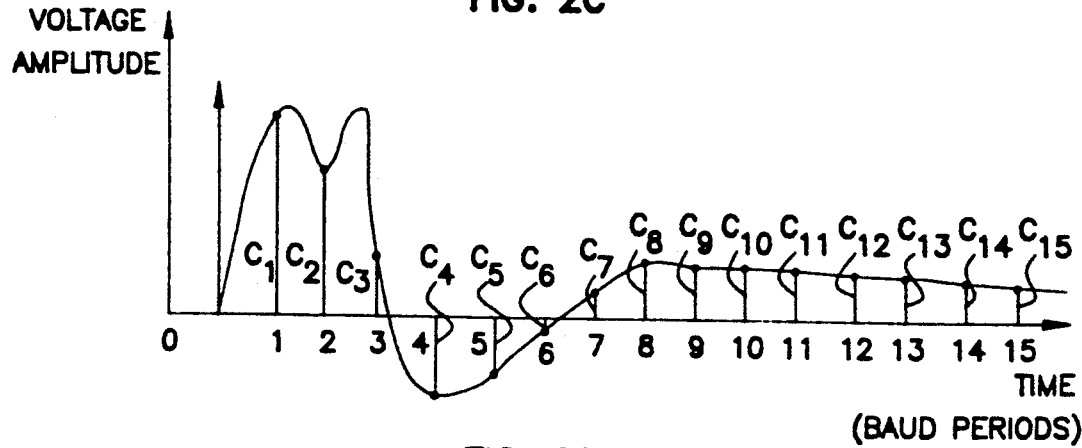
FIG. 2D shows the transhybrid response of FIG. 2B with a time scale between that of FIG. 2B and FIG. 2C and coefficients C1 through C15 representing the multiplier gain needed to echo cancel the data transmitted in FIG. 2A.

FIG. 2D shows the transhybrid response of FIG. 2B with an expanded time scale and includes coefficients $C1, C2, \ldots C15$. These coefficients will assist to illuminate the general process of cancelling the transhybrid response in prior art transversal filters. Assume that the amplitude of the transhybrid response in each time period is known. Then by multiplying each of the transmitted signals by a gain factor selected so that the resultant product equals the transhybrid response caused by the transmitted signal, the products could be subtracted from the received signal, thereby cancelling the echo. In this manner, coefficient C1 is selected to cancel the echo response caused by the transmitted signal in baud period 1, C2 is chosen to cancel the echo response caused by the transmitted signal in baud period 2, and so on. This selection of one coefficient per baud period represents the prior art method of cancelling echoes. The echo residue thus depends on the number of coefficients used. The manner of actually selecting the gain coefficients are well known in the art and typically follow the method described by Kurt H. Mueller in "A New Digital Echo Canceller for Two-Wire Full-Duplex Data Transmission" found in the *IEEE Transactions on Communications*, September 1976, at pp. 956-962.

In practice, a signal from one subscriber network to the other may be attenuated by the communication line by as much as 40 db while the reflected echoes may be almost as large as the transmitted signal. Since proper operation of the services using the phone lines may require that the residual echo be less than one millivolt, the echo must be suppressed by a factor of approximately 60 db. Echo cancellation of this magnitude using the prior art transversal filter scheme required a very large number of coefficients.

The present invention differs in the method of cancelling the well behaved portions of the transhybrid response, such as the tail portion of a transhybrid response when meeting ANSI T1.601-1988. In the preferred embodiment, one coefficient is used to cancel the average of the data transmitted in two sequential baud periods. This results in a savings in hardware over prior art methods while effectively cancelling the echo. In the present invention the echo residue depends both upon the number of coefficients used and the slope of the well behaved section of the transhybrid response. Errors in the echo estimate arise from the truncation of echo calculations and the averaging of the echo levels at two adjacent baud periods.

In the present application the nineteenth baud period was selected as the starting point to average adjacent baud periods based on calculations showing the errors due to averaging were of the same order of magnitude as the errors due to the truncation of echo calculations.

It is specifically contemplated that the principles of the present invention could be used with more than two adjacent baud periods, that echo calculation truncation could occur at other baud periods, and that other portions, even all, of the transhybrid response may be well-behaved and thus could benefit from the principles of the present invention.

Figure 3:
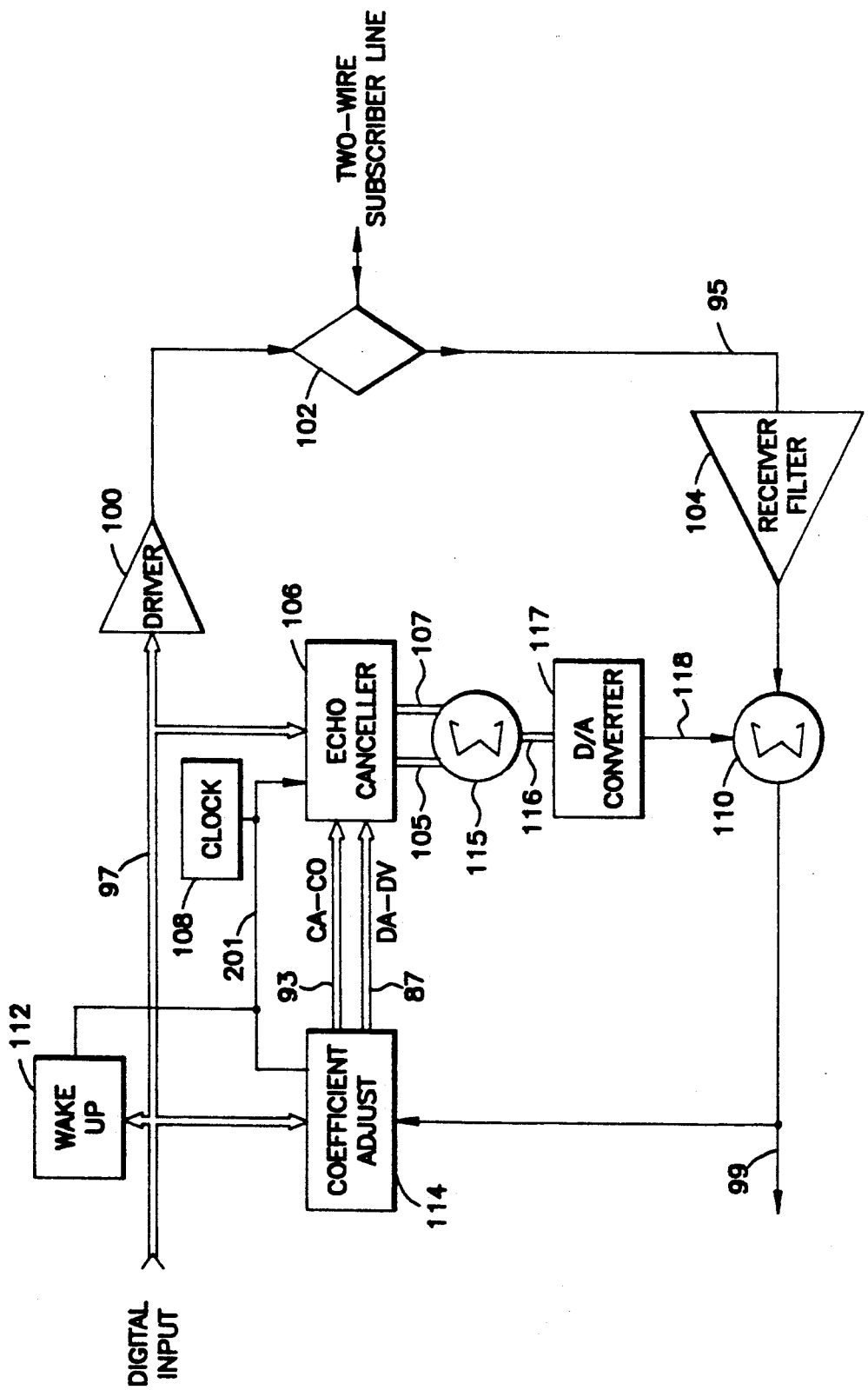
FIG. 3 shows a schematic block diagram of the line interface portion of a two-wire full duplex communication system in agreement with the integrated services digital network protocol.

FIG. 3 shows a very simplified block diagram of the line interface portion of a subscriber station having an echo-canceller 106 which will illuminate the principles of the present invention. Actual implementation of the preferred embodiment of the present invention is as a part of a very complex integrated circuit chip set fabricated on a silicon substrate. The complete echo cancelling network on the chip set includes an additional non-linear echo canceller described in co-pending patent application 07/507,595, filed 04-10-90, which is hereby incorporated by reference.

To assist understanding the principles of the present invention, the operation of FIG. 3 will be described immediately after a communication link between two subscribers has been implemented, at which time wake up circuit 112 applies a predetermined digital pattern of two digital bits according to ANSI T1.601-1988 protocol specifications to bus 97. This occurs so that the echo canceller can "learn" the characteristics of the phone line. Bus 97 contains a line for each of the digital bits used. While ANSI T1.601-1988 stipulates that two data bits are encoded into 4 voltage levels, other encoding schemes, such as three (3) data bits and eight (8) voltages levels, are specifically contemplated by the present invention.

Since two subscriber stations are involved, one does not transmit until the other's echo cancellation is completed. The predetermined digital pattern is applied via bus 97 to line driver 100. Line driver 100 is a digital-to-analog converter which converts the digital pattern to an analog signal corresponding t the specifications of ANSI T1.601-1988. The output of line driver 100 is sent to transformer 102 which interfaces the network of FIG. 3 to the two-wire subscriber line.

The digital pattern from wake up circuit 112 is also applied via bus 97 to echo canceller 106 and coefficient adjust 114. Required timing signals for wake up circuit 112, echo canceller 106, and coefficient adjust 114 is supplied via clock 108 on line 201. Since the other subscriber not transmitting the only signal on line 95 and received by filter 104 is the signal from line driver 100 plus the undesired echo components. The purpose of filter 104 is described below.

The assignees of the present invention have found from experimentation on actual telephone lines and from software simulation that latter parts of the transhybrid response when meeting the requirements of ANSI T1.601-1988 are "well behaved." Well behaved describes a function similar to one having a dominate single pole with a long time constant, which results in a function having a portion which changes slowly in an exponential manner. The latter part of the transhybrid response has a slender tail which exponentially decays in a manner that gets more and more predictable until, at some point, the response can be handled as a known quantity. This implies that at some point the transhybrid response can be assumed and not calculated. In the application of the preferred embodiment, the transhybrid response is calculated for the latest 60 data transmissions and assumed for all earlier transmissions.

Echo cancelling of the assumed portions of the transhybrid response is performed by filter 104. Filter 104 subtracts the assumed amount of echo from the received signal and outputs the resulting received signal to summation network 110.

The digital patterns from wake up circuit 112 are stored in echo canceller 106. Echo canceller 106 uses the digital patterns to output signals on line 105 and line 107 to summation network 110. These signals are adjusted, as explained subsequently, so that when summed in summation network 110 with the output of filter 104, the output of summation network 110 is low enough to permit reliable reception of the other subscriber's signal. At this time the received signal is said to be cancelled.

The output of summation network 110 is applied on line 99 to coefficient adjust 114. Prior to proper adjustment of the signals on lines 105 and 107, the output of summation network 110 is not cancelled, therefore coefficient adjust 114 has an input amplitude on line 99. Coefficient adjust 114 outputs signals on bus 93 and on bus 87 to echo canceller 106 dependant on the amplitude of the signal on line 99. In the preferred embodiment of the present invention bus 93 has 16 lines and bus 87 has 22 lines.

Echo canceller 106 uses the signals on bus 93 to assist in creating the signal output on line 105. The signals on each of the lines in bus 93 are applied as gains to multipliers inside echo canceller 106. These multipliers multiply the current transmitted digital pattern and some of the previous digital patterns by the gains. The products are then summed together creating the signal on line 105. This is similar to prior art transversal filter based echo cancelers.

Echo canceller 106 uses the signals on bus 87 to assist in creating the signal output on line 107. The signals on each of the lines of bus 87 are applied as gains to multipliers inside echo canceller 106. However, unlike prior art transversal filter based echo cancelers, the multipliers multiply the average of sequential pairs of prior digital patterns. The products are then summed together, creating the signal on line 107.

The method of actually selecting the gain coefficients wit the preferred embodiment of the present invention are the same as in prior art transversal filters and are well known in the art, typically following the method described by Kurt H. Mueller in "A New Digital Echo Canceller for Two-Wire Full-Duplex Data Transmission" found in the *IEEE Transactions on Communications*, September 1976, at pp. 956–962.

At the end of the wake up period the output of summation network 110 is sufficiently low to allow proper communication between subscribers. Wake up circuit 112 disconnects from bus 97 and digital information from the apparatus that the network of FIG. 3 is a part of is applied on bus 97. At this time the ISDN network has been set up to operate and the echo canceller 106 and coefficient adjust 114 continue to adapt to slowly varying changes in the phone line even with received signals present.

In the preferred embodiment of the present invention, the present digital pattern and the previous 15 are applied individually to multipliers connected to bus 93 while the 16th prior through the 59th prior digital patterns have multipliers connected to bus 87. Therefore, echo canceller 106 operates on 60 digital patterns, 1 for each line of bus 93 (16) plus 2 each for each line of bus 87 (44).

The transhybrid response of the network shown in FIG. 3 and in the present application is cancelled by individually selected gains in the early part of the response, shared gains in the latter portion of the response, and by an assumed response in the very late portion of the response.

Figure 4:
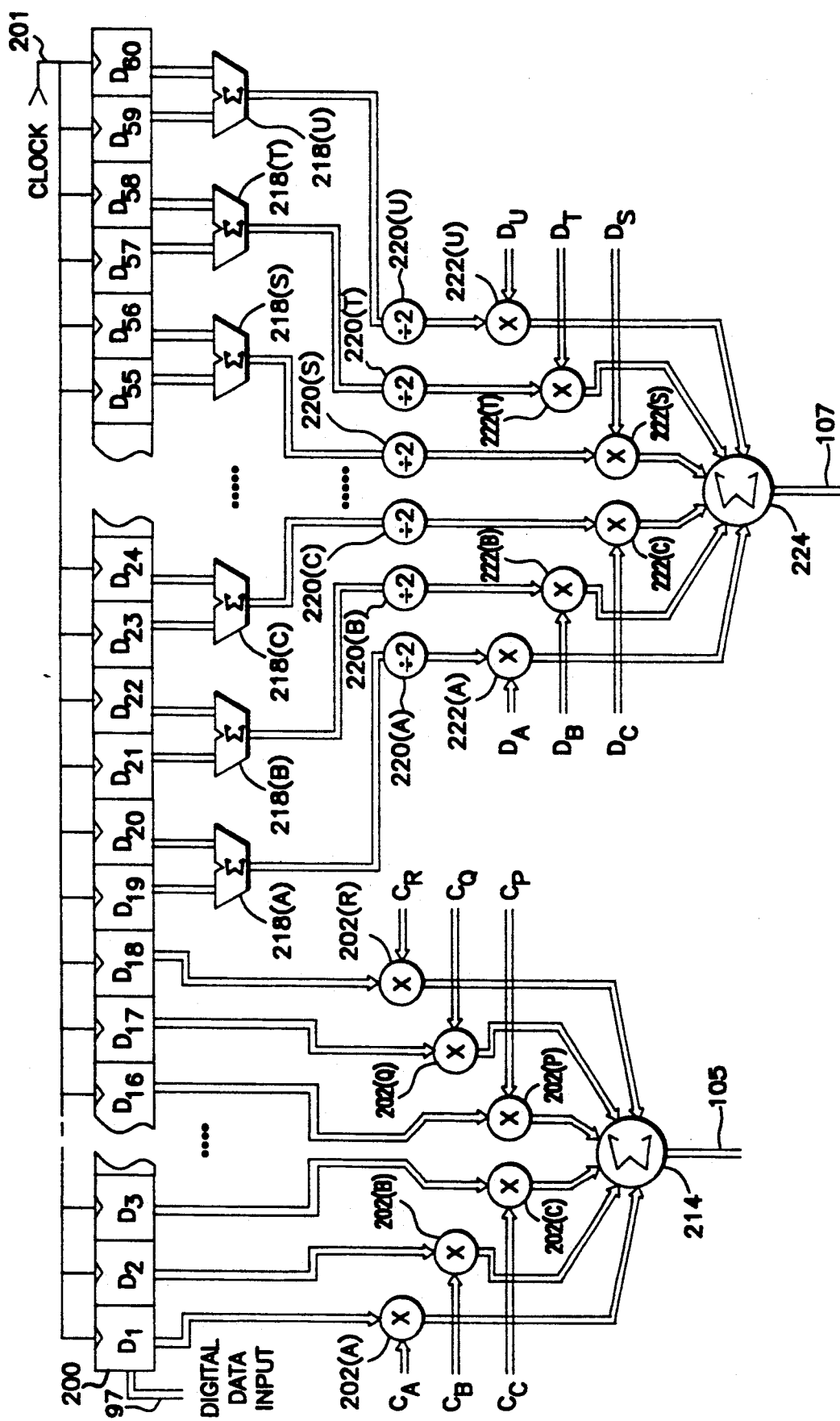
FIG. 4 shows a block diagram of the preferred embodiment of the present invention.

Please refer to FIG. 3 and FIG. 4 in the following discussion. FIG. 4 shows a block diagram of the present invention according to its preferred embodiment as part of echo canceller 106 in FIG. 3. The digital patterns applied on bus 97 are sent to shift register 200 having 60 individual registers. However, while the preferred embodiment contains 60 individual registers the present invention specifically contemplates any plurality of registers. In the preferred embodiment since the digital input on bus 97 consists of two digital bits, each individual register is capable of storing two bits. Again, it is specifically contemplated that any number of digital bits may be used with the present invention. The digital patterns on bus 97 are stored sequentially in shift register 200 under the control of a clock signal applied on line 201 until the 60th register. On the next clock the 61st digital pattern is lost.

The digital patterns stored in the first 16 registers of shift register 200 ar separately applied to individual multipliers 202(A)-202(P). This corresponds to the present digital pattern and the previous 15. Multipliers 202(A)-202(P) connect to individual registers D1-D16, respectively, of shift register 200. The digital patterns applied to multipliers 202(A)-202(P) are multiplied by coefficients from coefficient adjust 114 CA, CB, CC, ... CN, CO, CP, respectively. As indicated earlier these coefficients are set by coefficient adjust circuit 114. The output of multipliers 202(A)-202(P) are applied to summing node 214, which sums its inputs and outputs the total on line 105.

In the preferred embodiment of the present invention the digital patterns stored in adjacent pairs of registers from D17 to D60 are averaged together and then the result is applied to a multiplier. This is accomplished as follows: adding the digital patterns in registers D17 and D18 in adder 218(A), the digital patterns in registers D19 and D20 in adder 218(B), and so on until the digital patterns in registers D59 and D60 are applied to and added in adder 218(V); adders 218(A)-218(V) apply their totals to dividers 220(A)-220(V), respectively; dividers 220(A)-220(V) divide their inputs by two. The outputs of dividers 220(A)-220(V) are then applied to multipliers 222(A)-222(V), respectively. Multipliers 222(A)-222(V) multiply their inputs by coefficients DA, DB, DC, ... DT, DU, and DV, respectively, from coefficient adjust 114. The output of multipliers 222(A)-222(V) are applied to summing node 224, which sums its inputs and outputs the total to line 107.

Mathematically, the present invention splits an N register shift register into a plurality of lengths, at least one of which has at least two adjacent registers whose contents are averaged together and applied to a multiplier having a single coefficient. It is to be understood, however, that even though numerous characteristics and advantages of the present invention have been set forth in the foregoing description, together with details of the structure and function of the invention, the disclosure is illustrative only, and changes may be made in details to the full extent indicated by the broad general meaning of the terms in which the appended claims are expressed.

What is claimed is:

1. A transversal filter having a gain coefficient input, comprising:
   a shift register having a plurality of registers;
   averaging means associated with at least two registers of said plurality of registers, said averaging means for averaging data stored in said at least two registers and outputting averaged data; and
   a multiplier associated with said averaging means, said multiplier for multiplying said averaged data by the gain coefficient input.

2. The apparatus according to claim 1, wherein said at least two registers are sequentially adjacent.

3. The apparatus according to claim 2, wherein said averaging means comprises;
   an adder circuit having inputs associated with said at least two registers, said adder circuit for summing together data stored in said at least two registers and outputting said data as summed data; and
   a divider circuit connected to said adder circuit, said divider circuit for dividing said summed data by the number of said at least two registers.

4. A transversal filter having a plurality of gain coefficient inputs, comprising:
   a shift register having at least three registers;
   a first multiplier associated with a first register of said at least three registers, said first multiplier for multiplying data stored in said first register by a first gain coefficient input of the gain coefficient inputs and outputting the resultant as a first product;
   averaging means associated with at least a second register and a third register of said at least three registers, said averaging means for averaging data stored in said at least second and third registers and outputting averaged data; and
   a multiplier associated with said averaging means, said multiplier for multiplying said averaged data by a second gain coefficient input of the gain coefficient inputs.

5. The apparatus according to claim 4, wherein said at least three registers are sequentially adjacent.

6. The apparatus according to claim 5, wherein said averaging means comprises;
   an adder circuit having inputs associated with said at least second and third registers, said adder circuit for summing together data stored in the associated registers and outputting said data as summed data; and
   a divider circuit connected to said adder circuit, said divider circuit for dividing said summed data by the number of inputs of said adder circuit.

7. An echo cancelling apparatus having a plurality of gain coefficient inputs for echo cancelling a received signal, comprising:
   a shift register having at least three registers;
   a first multiplier associated with a first register of said at least three registers, said first multiplier for multiplying data stored in said first register by a first gain coefficient input of the gain coefficient inputs and outputting the resultant as a first product;
   averaging means associated with at least a second register and a third register of said at least three registers, said averaging means for averaging data stored in said at least second and third registers and outputting averaged data;
   a multiplier associated with said averaging means, said multiplier for multiplying said averaged data by a second gain coefficient input of the gain coefficient inputs and outputting the resultant as a second product; and summing means associated with said first product and with said second product and with the received signal, said summing means for outputting the difference between the received signal and the sum of said first and second products.

8. An echo cancelling apparatus having a plurality of gain coefficient inputs for echo cancelling a received signal, comprising:

a shift register having a plurality of registers;

averaging means associated with at least a first and a second register of said plurality of registers, said averaging mean for averaging data stored in said first and second registers and outputting averaged data;

an average multiplier associated with said averaging means, said average multiplier for multiplying said averaged data by a first gain coefficient input and outputting the resultant as an averaged product;

a plurality of simple multipliers associated with a plurality of said registers of said shift register, said simple multipliers for multiplying data stored in said associated registers by a plurality of simple gain coefficient inputs and outputting the results as a plurality of simple products; and summing means associated with said simple multipliers and with said average multiplier for adding said simple products and said averaged products together and outputting summed data.

9. The apparatus according to claim 8 further including an error means associated with the received signal and said summing means, said error means for finding the difference between the received signal and the summed data.

10. The apparatus according to claim 8, wherein said averaging means comprises;

an adder circuit having inputs associated with said at least first and second registers, said adder circuit for adding together data stored in said at least first and second registers and outputting said data as added data; and a divider circuit connected to said adder circuit, said divider circuit for dividing said added data by the number of inputs of said adder circuit.

11. A method of echo cancelling a received signal, comprising the steps of:

sequentially storing the present baud period data and at least the prior baud period data in a shift register;

averaging the data stored in said shift register and outputting the resultant as averaged data;

selecting a gain factor based on the system transhybrid response;

multiplying said averaged data by said gain factor to obtain an echo image; and subtracting the echo image from the received signal.

12. A method of echo cancelling on a two-wire full duplex communication line between a first subscriber and a second subscriber, comprising the steps of:

having the first subscriber generate a digital pattern;

having the first subscriber transmit on the two-wire full duplex communication line a signal based on said digital pattern;

having the first subscriber sequentially storing said digital pattern in a shift register;

having the first subscriber receive signals on the two-wire full duplex communication line, said signals being the composites of said transmitted signal, the transhybrid response, and any signals from a second subscriber;

applying said received signals to a first summing node creating an output signal;

applying the output signal to a coefficient adjust circuit;

generating a plurality of individual gain coefficients based on said output signal and applying said plurality of individual gain coefficients to a plurality of multipliers;

applying one of said stored digital patterns in a first register of said shift register directly to a first multiplier of said plurality of multipliers, multiplying the data applied to said first multiplier by a first coefficient of said plurality of individual coefficients and outputting the product to a second summing node;

applying the output of said second summing node to said first summing node;

averaging said stored digital patterns stored in at least a second register and a third register of said shift registers creating averaged data;

applying said averaged data to a second multiplier of said plurality of multipliers;

multiplying the averaged data applied by a second coefficient of said plurality of individual coefficients and outputting the product to a third summing node;

applying the output of said third summing node to said first summing node; and generating said plurality of individual gain coefficients so that said output of said first summing node is said signal from the second subscriber.

* * * * *

UNITED STATES PATENT AND TRADEMARK OFFICE
CERTIFICATE OF CORRECTION

PATENT NO. : 5,084,866
DATED : January 28, 1992
INVENTOR(S) : Kenneth G. Buttle

It is certified that error appears in the above-identified patent and that said Letters Patent is hereby corrected as shown below:

Column 1, line 29, "wa" should read --was--.
Column 4, line 28, "t" should read --to--.
Column 7, line 39, "t" should read --to--.
Column 8, line 44, "wit" should read --with--.

Signed and Sealed this

Twenty-first Day of September, 1993

Attest:

BRUCE LEHMAN

Attesting Officer

Commissioner of Patents and Trademarks